(12) United States Patent
Scott et al.

(10) Patent No.: US 8,729,848 B2
(45) Date of Patent: *May 20, 2014

(54) FAIL-PASSIVE VARIABLE GRADIENT CONTROL STICK DRIVE SYSTEM

(75) Inventors: Craig Scott, Highland Park, IL (US); Darryl S. Stachniak, Chicago, IL (US)

(73) Assignee: Woodward MPC Inc., Skokie, IL (US)

( * ) Notice: Subject to any disclaimer, the term of this patent is extended or adjusted under 35 U.S.C. 154(b) by 592 days.

This patent is subject to a terminal disclaimer.

(21) Appl. No.: 12/976,723

(22) Filed: Dec. 22, 2010

(65) Prior Publication Data

US 2012/0160967 A1 Jun. 28, 2012

(51) Int. Cl.
*G05B 11/01* (2006.01)

(52) U.S. Cl.
USPC ...... 318/560; 318/568.16; 318/632; 244/220; 244/221; 244/223; 244/228

(58) Field of Classification Search
USPC ............. 318/560, 568.16, 632; 244/220, 221, 244/223, 228
See application file for complete search history.

(56) References Cited

U.S. PATENT DOCUMENTS

| | | | | |
|---|---|---|---|---|
| 3,776,058 | A | * 12/1973 | French | 74/471 XY |
| 3,902,379 | A | 9/1975 | Bennett et al. | |
| 4,422,851 | A | * 12/1983 | Hayashigawa et al. | 434/45 |
| 4,473,203 | A | 9/1984 | Barnoin et al. | |
| 4,688,443 | A | 8/1987 | Fabre et al. | |
| 4,716,399 | A | 12/1987 | Nordlund | |
| 4,717,098 | A | * 1/1988 | Walker et al. | 244/223 |
| 5,107,080 | A | * 4/1992 | Rosen | 200/6 A |
| 5,149,023 | A | 9/1992 | Sakurai et al. | |
| 5,291,113 | A | * 3/1994 | Hegg et al. | 318/584 |
| 5,456,428 | A | 10/1995 | Hegg | |
| 5,694,014 | A | * 12/1997 | Hegg et al. | 318/564 |
| 5,900,710 | A | 5/1999 | Gautier et al. | |
| 6,128,554 | A | 10/2000 | Damotte | |
| 6,572,055 | B1 | 6/2003 | Bernard | |

(Continued)

FOREIGN PATENT DOCUMENTS

| | | |
|---|---|---|
| EP | 1 918 196 A1 | 5/2008 |
| FR | 2 558 136 A1 | 7/1985 |

(Continued)

OTHER PUBLICATIONS

U.S. Appl. No. 12/844,867, filed Jul. 28, 2010, Szulyk et al.

(Continued)

*Primary Examiner* — Erick Glass
(74) *Attorney, Agent, or Firm* — Reinhart Boerner Van Deuren P.C.

(57) ABSTRACT

A control system for an aircraft including a passive feedback arrangement, a stick and a positioning arrangement is provided that provides for user adjustability of the resistance applied to the stick, such as in a fly-by-wire system. The passive feedback arrangement is movable relative to a mechanical ground. The stick is moveable relative to the mechanical ground and the passive feedback arrangement. The passive feedback arrangement acts on the stick to resist movement of the stick relative to the passive feedback arrangement. This resistance provides passive feedback to the pilot for the fly-by-wire system. The positioning arrangement is coupled to the passive feedback arrangement for adjusting the position of the passive feedback arrangement relative to the mechanical ground in response to movement of the stick relative to the mechanical ground.

21 Claims, 5 Drawing Sheets

(56) References Cited

U.S. PATENT DOCUMENTS

| | | |
|---|---|---|
| 2002/0135327 A1 | 9/2002 | Szulyk et al. |
| 2004/0160415 A1* | 8/2004 | Rosenberg et al. ........... 345/156 |
| 2008/0142642 A1 | 6/2008 | Marino et al. |

FOREIGN PATENT DOCUMENTS

| | | |
|---|---|---|
| GB | 126568 | 5/1919 |
| GB | 827089 | 2/1960 |
| GB | 925471 | 5/1963 |
| GB | 2465761 A | 6/2010 |
| GB | 2482407 A | 2/2012 |
| JP | 2008/204098 A | 9/2008 |

OTHER PUBLICATIONS

U.S. Appl. No. 12/845,160, filed Jul. 28, 2010, Stachniak et al.
U.S. Appl. No. 12/845,246, filed Jul. 28, 2010, Stachniak et al.
U.S. Appl. No. 12/910,193, filed Oct. 22, 2010, Burroughs et al.

* cited by examiner

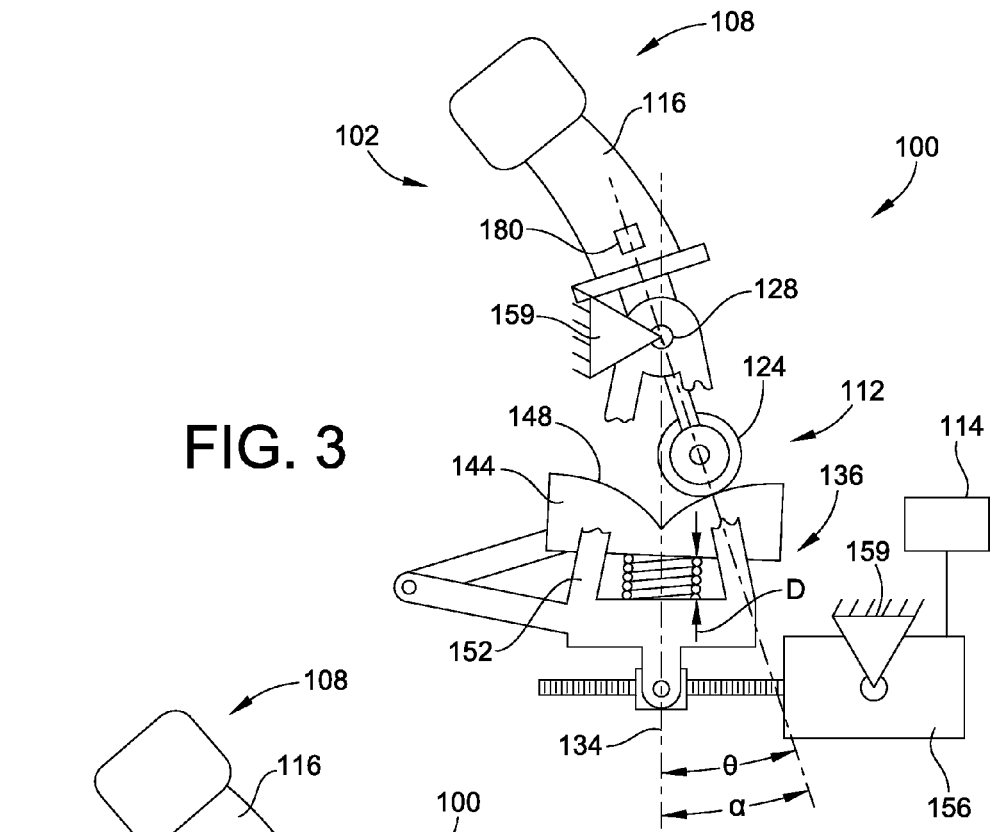

FAIL-PASSIVE VARIABLE GRADIENT CONTROL STICK DRIVE SYSTEM

FIELD OF THE INVENTION

This invention generally relates to control sticks for aircrafts and more particularly to fly-by-wire control sticks for aircrafts.

BACKGROUND OF THE INVENTION

As the performance requirements of both civil and military aircraft increases, conventional control technologies using mechanical linkages cannot relieve the pilot from higher mental and manual control activity. As such, today's high performance aircraft as well as some transport aircraft use "fly-by-wire" sidesticks, center sticks, yokes, joysticks and control columns. As used herein, these devices will be generically referred to either "control columns" or "control sticks," with these terms being generally synonymous in a generic sense.

These fly-by-wire control columns simulate tactile feedback relating to the forces acting on the control surfaces of the aircraft to the control columns.

In a "passive" control column, the pilot feels spring or damper forces according to the applied deflection of a stick of the control column which is the control input to a flight control computer (FCC). These forces are realized by a spring and damper package. In such a passive control column, the force profile applied to the stick which provides the tactile feedback to the pilot is fixed.

It is desired to provide a control column that improves on the current state of the art.

BRIEF SUMMARY OF THE INVENTION

Embodiments of the present invention relate to new and improved control systems for aircrafts. More particularly, embodiments of the present invention relate to new and improved fly-by-wire control systems for aircrafts. Even more particularly, embodiments of the present invention relate to new and improved fly-by-wire control systems that utilizes passive feedback to a control stick.

Various embodiments of the invention will now be disclosed. These embodiments could be combined, where appropriate, into a single embodiment.

In one particular embodiment, a control system for an aircraft including a passive feedback arrangement, a stick and a positioning arrangement is provided. The passive feedback arrangement is movable relative to a mechanical ground. The stick is moveable relative to the mechanical ground and the passive feedback arrangement. The passive feedback arrangement acts on the stick to resist movement of the stick relative to the passive feedback arrangement. This resistance provides passive feedback to the pilot for the fly-by-wire system. The positioning arrangement is coupled to the passive feedback arrangement for adjusting the position of the passive feedback arrangement relative to the mechanical ground in response to movement of the stick relative to the mechanical ground.

The ability to adjust the position of the passive feedback arrangement allows the user to configure the system with modified feedback force profiles.

More particularly, in one embodiment, the positioning arrangement is configured with user selectable resistance modes including a default mode and at least one custom mode. When in the custom mode, the positioning arrangement adjusts the position of the passive feedback arrangement relative to the mechanical ground in response to movement of the stick relative to the mechanical ground. This adjusts a resistance profile applied to the stick by the passive feedback arrangement.

In one embodiment, the positioning arrangement includes an actuator coupled to the passive feedback arrangement for actively adjusting the position of the passive feedback arrangement relative to the mechanical ground. The positioning arrangement may include a controller controlling the actuator to adjust the position of the passive feedback arrangement. This controller can receive positional information relating to the position of the stick relative to the mechanical ground and control the position of the passive feedback arrangement based on this information. The controller could use rate of change in position, absolute position or other positional information of the stick to control the positioning of the passive feedback arrangement. By changing the position of the passive feedback arrangement relative to the mechanical ground, movement of the stick relative to mechanical ground results in different amounts of displacement of the passive feedback arrangement to modify the amount of force applied to the stick for a given degree of stick displacement.

In one embodiment, the positioning arrangement is configured such that the at least one custom mode includes a stiff mode in which the positioning arrangement adjusts the position of the passive feedback arrangement relative to the mechanical ground to increase the resistance profile to increase the resistance applied to the stick opposing movement of the stick relative to the mechanical ground.

In another embodiment, the positioning arrangement is configured such that the at least one custom mode includes a soft mode in which the positioning arrangement adjusts the position of the passive feedback arrangement relative to the mechanical ground to decrease the resistance profile to decrease resistance applied to the stick opposing movement of the stick relative to the mechanical ground.

In a further embodiment, the positioning arrangement is configured with both a soft mode and firm mode. These modes may be pilot selectable or modifiable.

In one embodiment, the positioning arrangement is configured such that in the stiff mode, the positioning arrangement drives the passive feedback arrangement relative to the mechanical ground in a direction opposite a direction of movement of the stick relative to the mechanical ground.

In one embodiment, the positioning arrangement is configured such that in the soft mode, the positioning arrangement drives the passive feedback arrangement relative to the mechanical ground in a same direction as a direction of movement of the stick relative to the mechanical ground.

Again, these two modes of operation could be combined into a single mode such that the positioning arrangement is configured such that in the stiff mode, the positioning arrangement drives the passive feedback arrangement relative to the mechanical ground in a direction opposite a direction of movement of the stick relative to the mechanical ground. Also, the positioning arrangement is configured such that in the soft mode, the positioning arrangement drives the passive feedback arrangement relative to the mechanical ground in a same direction as the direction of movement of the stick relative to the mechanical ground.

Typically, in the default mode, the positioning arrangement is configured to hold the passive feedback arrangement in a fixed position relative to the mechanical ground.

To allow for manipulation of the resistance profiles, in some embodiments the passive feedback arrangement includes a gimbal carrying a resistance arrangement. The positioning arrangement is coupled to and selectively adjusts the position of the gimbal and the resistance arrangement relative to the mechanical ground. In further embodiments, the stick and the gimbal are pivotably coupled to rotate about a common axis.

In one embodiment, the stick engages the resistance arrangement and movement of the stick relative to the gimbal changes the position of the resistance arrangement relative to the gimbal. The changes in the position of the resistance arrangement relative to the gimbal changes the resistance the passive feedback arrangement applies to the stick to resist movement of the stick.

Embodiments may further include the position sensor that senses the position of the stick relative to the mechanical ground. The controller controls the actuator to adjust the position of the passive feedback arrangement based on the sensed position sensed by the position sensor. This position sensor could also be the position sensor used by the control system to generate the control signals to the actuators for controlling the position of the control surfaces of the aircraft.

In some embodiments, the use of the passive feedback arrangement allows the system to be an indirect system. More particularly, the positioning arrangement is indirectly coupled to the stick via the passive feedback arrangement such that the stick can move relative to the mechanical ground independent of movement of the positioning arrangement. This provides a benefit of providing a fail passive device that if the positioning arrangement were to fail, the pilot can still manipulate the stick to control the aircraft.

In one embodiment, the stick is moveable relative to the mechanical ground independent of the positioning system, which again allows for a fail passive device that allows the pilot to manipulate the stick in the event of a failure of the positioning system.

In one embodiment, the positioning arrangement drives the passive feedback arrangement relative to the mechanical ground in a direction opposite a direction of movement of the stick relative to the mechanical ground.

In one embodiment, the positioning arrangement is configured such that the positioning arrangement drives the passive feedback arrangement relative to the mechanical ground in a direction that is the same as a direction of movement of the stick relative to the mechanical ground.

In one embodiment, the positioning arrangement is user configurable to adjust a rate at which the positioning arrangement adjusts the position of the passive feedback arrangement relative to the mechanical ground relative to a rate at which the stick is moved relative to the mechanical ground.

In one embodiment, the positioning arrangement is configured to be user switched between a first mode in which the positioning arrangement adjusts the position of the passive feedback arrangement relative to the mechanical ground in a same direction as a direction of the movement of the stick relative to the mechanical ground and a second mode in which the positioning arrangement adjusts the position of the passive feedback arrangement relative to the mechanical ground in an opposite direction as the direction of the movement of the stick relative to the mechanical ground.

In some embodiments, the movement of the stick and passive feedback arrangement are angular about a common pivot axis.

In a more particular embodiment, the stick is moveable relative to the mechanical ground in a first direction; the passive feedback arrangement is movable relative to the mechanical ground in the first direction and in a second direction, opposite the first direction; the positioning arrangement configured with a default mode, a stiff mode and a soft mode; in the default mode, the positioning arrangement is configured to maintain the passive feedback arrangement in a fixed position relative to the mechanical ground when the stick is moved relative to the mechanical ground; in the stiff mode, the positioning arrangement is configured to move the passive feedback arrangement in the second direction relative to the mechanical ground in response to movement of the stick in the first direction; and in the soft mode, the positioning arrangement is configured to move the passive feedback arrangement in the first direction relative to the mechanical ground in response to movement of the stick in the first direction.

Again, some embodiments allow the user to incrementally adjust the deviation in the resistance profile from the baseline resistant profile when the passive feedback arrangement remains stationary relative to the mechanical ground. For instance, there may be a maximum stiff mode wherein the movement of the passive feedback arrangement in the direction opposite the movement of the stick is equal in magnitude to the movement of the stick. However, the system could be alternatively user configured to an intermediate stiff mode such that the movement of the passive feedback arrangement in the direction opposite the movement of the stick is one-half the magnitude of the movement of the stick relative to the mechanical ground. Thus, the system can be incrementally programmed between zero modification in the position of the feedback arrangement (i.e. the default mode) or to one hundred percent of the maximum stiff mode.

The same adjustability applies for the soft mode.

This configurability provides further optimization for the pilot.

Methods of resisting movement of a stick of an aircraft control system are also provided. One method includes the steps of sensing movement of stick relative to a mechanical ground; and adjusting a position of a passive feedback arrangement relative to the mechanical ground in response to the sensed movement of the stick relative to the mechanical ground, the passive feedback arrangement providing resistance to the movement of the stick relative to the mechanical ground.

In one method, the step of adjusting the position of the passive feedback arrangement includes adjusting the position of the passive feedback arrangement in a same direction as a direction of the sensed movement of the stick.

In another method, the step of adjusting the position of the passive feedback arrangement includes adjusting the position of the passive feedback arrangement in an opposite direction as a direction of the sensed movement of the stick.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIGS. 3, 4 and 6 illustrate operation of the control column of FIG. 1; and

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
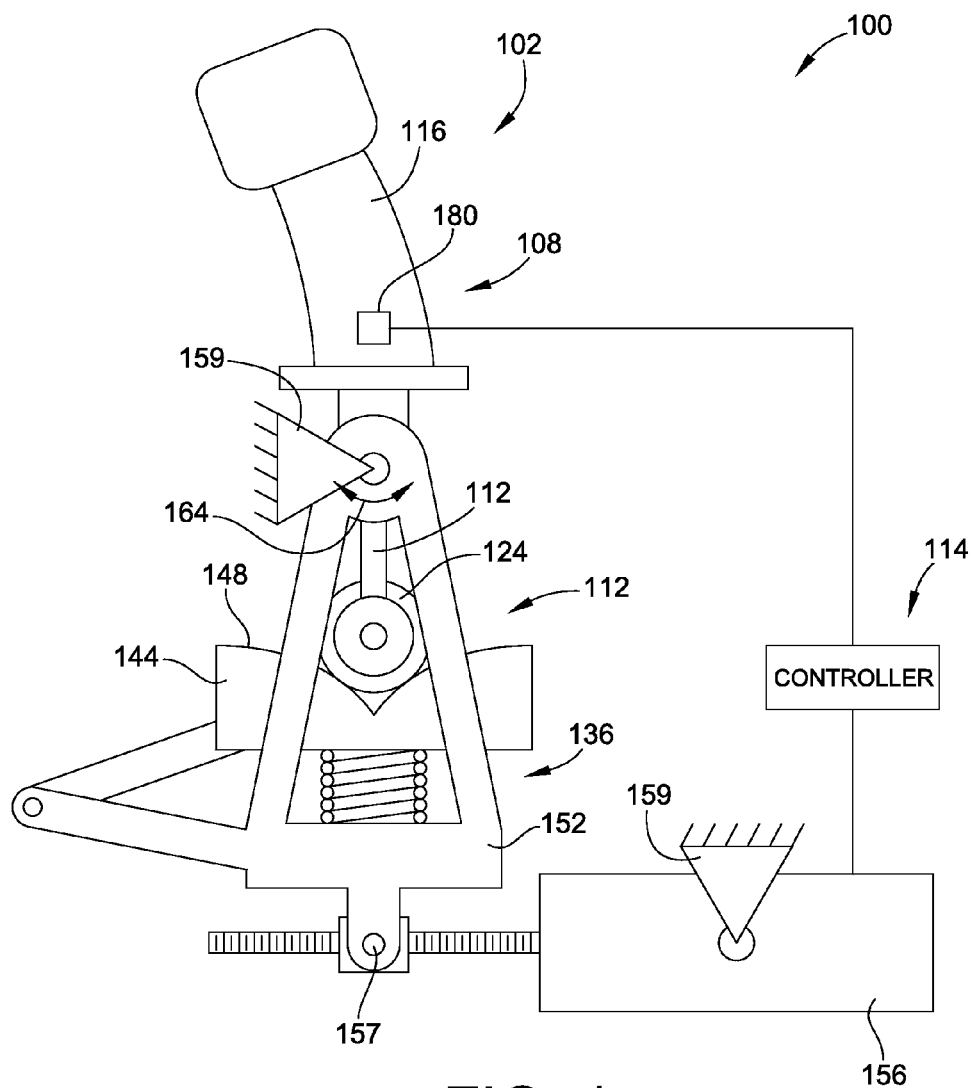
FIG. 1 is a simplified schematic illustration of a control column according to an embodiment of the present invention.

FIG. 1 is a simplified schematic illustration of an aircraft control system 100 for controlling pitch, roll or both pitch and roll of an aircraft. The aircraft control system 100 generally includes control column 102. The control column 102 is used by the pilot to control various operation of the aircraft such as pitch, roll and/or pitch and roll.

The control column 102 is considered fly-by-wire control columns because the manipulation of the control column to adjust the pitch and/or roll of the aircraft is not translated directly to the control surfaces of the aircraft by mechanical devices. Instead, the deviations of the control column from a neutral position are sensed and then converted into electrical signals. These signals are then sent to actuators which use the electrical signals to make proportional changes in the control surfaces of the aircraft.

Because the control column 102 is not mechanically linked to the control surfaces, the control system 100 incorporates tactile feedback that is applied to the control column 102 to simulate the feeling that a pilot would get if the control column 102 was in fact mechanically coupled to the control surfaces. In general, if the pilot requests a large degree of pitch or roll, the tactile feedback would increase the amount of force the pilot would have to apply to the control column to implement that change in the control surfaces. As such, a large degree of deviation in the current control of the aircraft would be executed by applying a large force to the corresponding control column by the pilots.

Embodiments of the present invention allow for user adjustment of the force profile of the feed back. More particularly, a given pilot can modify the feedback to provide more or less resistance for a given amount of displacement from a ground neutral position.

The control column 102 generally includes stick 108 with which the pilot inputs control signals relating to desired pitch and/or roll. The stick 108 interacts with feedback assembly 112, in the form of a passive centering mechanism, to provide tactile feedback to the pilot gripping stick 108. The column 102 is coupled to an electronic control arrangement 114 (also referred to generally as controller 114) that controls dynamic adjustments of the feedback assembly 112.

Stick 108 generally includes a grip portion 116 that the pilot manually manipulates to control the desired amount of pitch and/or roll. Grip portion 116 is operably coupled to a connecting rod 120. The connecting rod 120 is operably coupled to or includes one or more cam follower 124. Cam follower 124 is illustrated as a roller in the present embodiment. The cam follower 124 interacts with feedback assembly 112 to provide a tactile feedback profile (also referred to as a force profile) to the stick 108. As will be discussed more fully below, this force profile can be varied to make it harder or easier for the pilot to manipulate the stick 108 depending on desired resistance levels of the pilot.

The stick 108 pivots angularly about common pivot point 128 relative to the mechanical ground. As illustrated in FIG. 1, the stick 108 is positioned in a ground neutral position. The angular displacement of the stick 108 relative to the ground neutral position corresponds to the amount of pitch or roll that the pilot is requesting. The amount of displacement from the ground neutral position corresponds to the amount of change in the position of the corresponding control surfaces of the aircraft.

In general, the feedback assembly 112 acts on the stick 108 and provides tactile feedback to the pilot by providing resistance to the movement of the stick 108 relative to feedback assembly 112 when the stick 108 is moved relative to mechanical ground and particularly from the ground neutral position. The feedback assembly 112 provides passive feedback. This passive feedback is provided by resistance arrangement 136 (i.e. a spring and damper package) that opposes the rotational movement of stick 108 from the ground neutral position. The movement of the stick 108 relative to the feedback assembly 112 causes increased displacement of the resistance arrangement 136.

In one embodiment, the resistance provided by the resistance arrangement increases the greater the amount of angular displacement or deflection of the stick 108 from the ground neutral position. This resistance provides feedback to the pilot such that when the pilot requests a certain amount of pitch or roll, the pilots muscle memory will tend to apply a certain amount of pushing or pulling force to overcome the force of the springs and dampers of the resistance arrangement 136. Thus, the pilots will "learn" how much force is needed for control of the aircraft, i.e. how much force is used to adjust the position of the stick 108 relative to ground neutral for a given amount of pitch and/or roll.

Again, embodiments of the invention allow the force profile of the feedback assembly 112 to be tailored to a desired feedback profile.

The feedback assembly 112 includes a profiled cam 144 that has a V-shaped cam surface 148 with which cam follower 124 interacts. As the cam follower 124 transitions away from the center, i.e. bottom of the "V", of the cam surface 148 the resistance arrangement 136 increases the amount of resistance applied to the stick 108 to provide tactile feedback to the pilot.

The center point of cam surface 148 can also be referred to as a "feedback neutral position" or a "gimbal neutral position", because in this position, no rotational force is being applied to the stick 108 by the feedback assembly 112. In one embodiment, in the feedback neutral position (as shown in FIG. 1), the cam follower 124 will contact both sides of the V-shaped cam surface 148 such that no force is applied to the stick 108 by the feedback assembly 112.

The cam 144 in combination with the resistance arrangement 136 can be referred to as passive centering mechanism as the forces generated thereby attempt to always drive the stick 108 toward the center of the cam 144, which correspond to the feedback neutral position as well as ground neutral position in this embodiment.

In general, the greater the displacement of the stick 108 along cam 144 relative to the feed back neutral position, the greater resistance or force the pilot experiences at grip 116.

However, different pilots may prefer different force profiles. For instance, some pilots may desire a "stiff" force profile which requires more force to displace the stick 108 a given amount of displacement about common pivot 128. Similarly, some pilots may desire a "soft" force profile which requires less force to displace the stick 108 the same amount of displacement about the common pivot 128. Thus, the control system 100 can be switched between different user selectable resistance modes, such as a default mode, a stiff mode or a soft mode.

Figure 2:
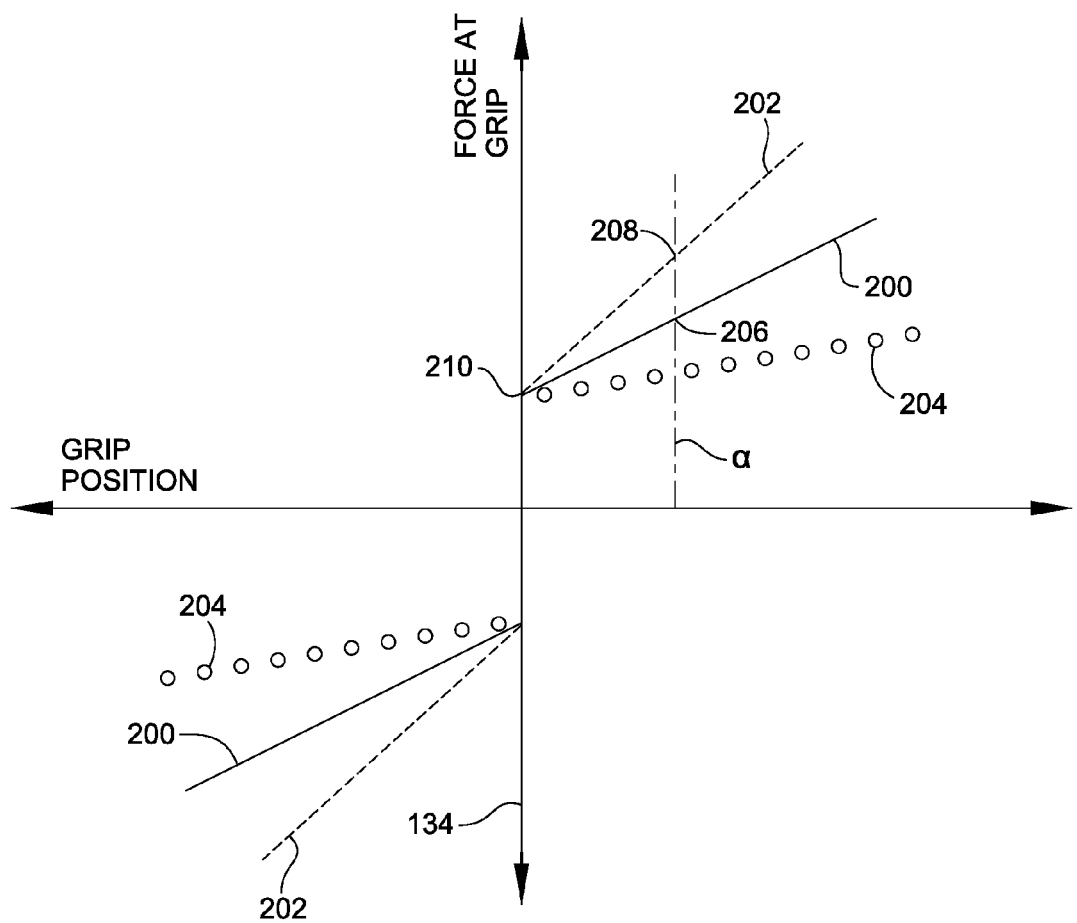
FIG. 2 is a graph of varying simplified force profiles that can be used with the control column of FIG. 1 that illustrates the resistance applied to the stick relative to the stick position for different modes of operation.

Simplified schematic representations of these schematic force profiles are illustrated in FIG. 2. The solid lines 200 represent a "default" force profile. There is an initial jump in force that is required for the pilot to overcome before the stick 108 can be moved in either direction. This jump in force is often referred to as the breakout force. Then, as the stick 108 is continuously displaced from the ground neutral position, the magnitude of the force felt at the grip increases. It should be noted that solid lines 200 show a generally linear increase in magnitude. However, this is merely a schematic representation of the change in magnitude because the given force profile could take on different shapes that may be linear, non-linear, or even discontinuous.

Dashed lines 202 represent a "stiff" force profile. With the stiff force profile, the pilot must apply more force to the grip 116 to get a same amount of displacement from ground neutral position as compared to a pilot who has his control column 102 set to a default force profile.

Circled lines 204 represent a "soft" force profile. With the soft force profile, the pilot must apply less force to the grip 116 to get a same amount of displacement from ground neutral position as compared to a pilot who has his control column 102 set to a default force profile.

It should be noted that only three (3) force profiles have been illustrated in FIG. 2. More or less force profiles could be incorporated into systems according to the invention. A pilot may be able to continuously customize the force profile between the limits of the stiff and soft force profiles. Further, some embodiments may allow the pilot to only adjust a portion of the force profile, such as just the force profile for positive displacement from ground neutral while the force profile for the negative displacement from ground neutral remains at a default level. Additionally, some may allow the force profile for positive displacement to be adjusted to different degrees or even in opposite manners as the force profile for negative displacement from the ground neutral position.

To allow for customization of the force profile and operating in the different modes, the system 100 includes a positioning arrangement that includes movable gimbal 152 that is driven by actuator 156 to dynamically adjust the position of cam 144 relative to the mechanical ground 159. The adjustment of the position of the cam 144 relative to mechanical ground 159 can dynamically adjust the force feedback profile relative to mechanical ground 159. Thus, different force can be applied to the stick 108 depending on the settings of the feedback assembly 112 for a given displacement of the stick 116 from the ground neutral position.

In the illustrated embodiment, actuator 156 is illustrated as a linear actuator pivotally coupled to the mechanical ground 159 and pivotally coupled to gimbal 152 at joint 157. However, other actuators could be used such as a rotary actuator positioned, for example, at pivot point 128 or motors having gears that act on corresponding gearing of gimbals 152. Other types of drive mechanisms could be used for adjusting the position of the gimbal 152 relative to mechanical ground 159 and the ground neutral position.

When set to the "default mode" using the default force profile, actuator 156 will typically fix the position of gimbal 152. Thus, as the stick 108 is displaced, illustrated generically by double arrow 164, gimbal 152 and cam 144 remain in a generally fixed angular position about common pivot 128. With reference to FIG. 3, grip 116 has been manipulated such that the stick 108 has been rotated about common pivot 128 by an angle of α relative to ground neutral position 134. This produces a given amount of force to the stick grip, illustrated at location 206 in FIG. 2 along default force profile 200. It can be seen that gimbal 152 has not moved relative to the mechanical ground and the ground neutral position 134 passes through the bottom of the V-shaped cam surface 148 of cam 144. Force 206 (FIG. 2) is generated due to the magnitude of the displacement D of the cam 144 relative to gimbal 152. The magnitude of the displacement D determines the amount of compression of the springs in the resistance arrangement.

With reference to FIG. 4, the control system 100 has been set to a "stiff mode." In stiff mode, the force profile is more resistive to displacement of the stick 108 relative to the ground neutral position 134. In FIG. 4, the stick 108 is displaced the same angle α relative to ground neutral position 134. With reference to FIG. 2, by displacing stick 108 by the angle of α, the force at grip 116 has increased to the amount illustrated generally at 208 along force profile 202.

To increase the amount of force, the controller 114, which may be considered part of the positioning arrangement, acts to adjust the position of the cam 144 relative to ground neutral 134. By adjusting the position of cam 144 by an angle β, a same angular input of angle α to stick 108, provides a relative displacement θ of the stick 108 relative to feedback neutral position 170 that is greater than in the default mode. This causes the cam follower 124 to have been moved further along cam surface 148 resulting in increased displacement D1 of the cam 144 relative to gimbal 152. The increased displacement D1 of cam 144 relative to gimbal 152 increases the amount of displacement of the springs and dampers of resistance arrangement 136 increasing the amount of force that is applied to stick 108 resisting movement of stick 108 from the ground neutral position 134.

Thus, once the pilot has applied enough force to overcome the breakout force, illustrated at 210 in FIG. 2, to cause the stick 108 to move relative to cam 144 in counter-clockwise direction 172 (illustrated as arrow 172) from the ground neutral position 134, the controller 114 will drive actuator 156 to drive gimbal 152 in the opposite, clockwise direction 174 (illustrated as arrow 174) from the ground neutral position 134.

In the stiff mode, the gimbal 152 is driven in the opposite direction as the stick 108 about common pivot 128. This opposite movement of the gimbal 152 and stick 108 increases the relative displacement θ of the cam follower 124 and cam 144 for a same amount of stick displacement α relative to ground neutral position 134 as the default mode.

Figure 6:
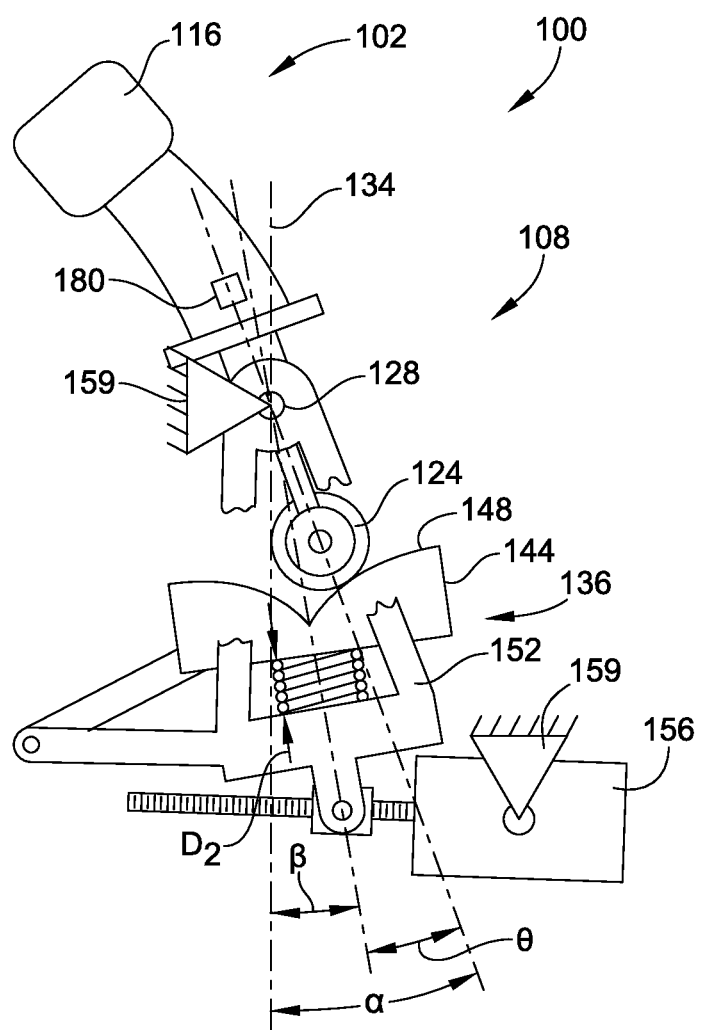

FIG. 6 illustrates the soft mode. In the soft mode, the gimbal 152 moves in the same direction as the stick 108 about common pivot 128 once the pilot has overcome the initial breakout force necessary to move the stick 108 relative to cam 144. This is because, in the soft mode, the force applied to the stick 108 by the feedback assembly 112 is to be less than the force applied to the stick 108 by the feedback assembly 112 in the default mode. This relationship is illustrated in FIG. 2.

To reduce the force applied by the resistance arrangement 136 to stick 108, the displacement D2 of the cam 144 relative to gimbal 152 must be reduced relative to displacement D (see FIG. 3) during the default mode for a same amount of displacement α of the stick 108 relative to the ground neutral position 134. This results in a reduced relative displacement θ between the cam follower 124 and cam 144. Due to the reduced relative displacement θ, cam follower 124 travels a shorter distance along cam surface 148 and reduces the amount of displacement D2 of cam 144 relative to gimbal 152 reducing the amount of force applied to stick 108.

Figure 5:
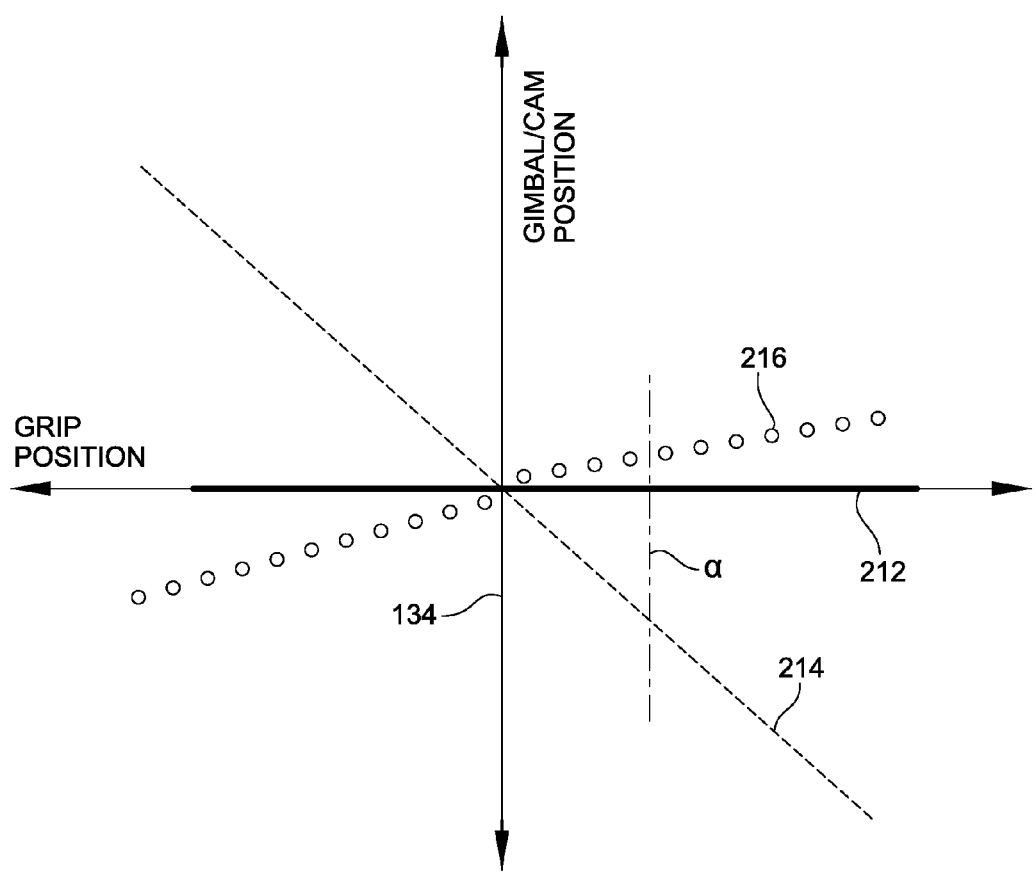
FIG. 5 is graph of the position of a resistance arrangement of the control column of FIG. 1 relative to stick position for various modes of resistance for the control column of FIG. 1.

FIG. 5 plots the gimbal/cam position (i.e. displacement β) relative grip displacement α. Solid line 212 represents the default mode. As such, the gimbal position remains at zero (0) for all grip positions because the gimbal 152 does not move during default mode. The dashed line 214 represents the stiff mode. As such, the gimbal position is negative when grip position is positive and the gimbal position is positive when the grip position is negative. The circled line 216 represents the soft mode. As such, the gimbal position is positive when grip position is positive and the gimbal position is negative when the grip position is negative. These positions are measured from a ground neutral position. Positive and negative are used herein for illustrative purposes only.

As can be seen, during the soft and stiff modes, the force gradient provided by the feedback assembly 112 is altered from the force gradient provided during default mode. In the stiff mode, the force gradient is higher and during soft mode, the force gradient is lower.

During the stiff and soft modes, the controller 114 can use positional information of the stick 108 sensed by position sensor 180 to control the positioning of gimbal 152. This can be either absolute position or changes or incremental displacement of the stick 108. When the position sensor 180 senses a change in position of the stick 108 relative to ground 159 (i.e. ground neutral position 134), the controller 114 can instruct a predetermined change in the position of gimbal 152 relative to mechanical ground 159 and ground neutral position 134. Typically, this sensing and updating to the change in position of the gimbal 152 is being continuously sampled such that the gimbal 152 moves substantially in unison with any changes in position of the stick 108.

The stiff and soft modes can be user adjusted by adjusting the rate of movement of the gimbal 152, i.e. adjusting the slopes of lines 214, 216 in FIG. 5. A steeper line 214 will provide a stiffer force profile. A steeper line 216 will provide a softer force profile.

Again, lines 214, 216 need not be linear and could take different shapes.

Additionally, the changes in the force profile illustrated in FIG. 2 show changes in the slope of lines 200, 202, 204. However, alternative methods could merely offset the default force profile up or down on the graph in FIG. 2 such that the shape of the different profiles are substantially the same, but that they are merely vertically offset from one another. In those arrangements, where the stiff or soft force profile is substantially merely an offset version of the default force profile this would be accomplished by a single displacement of the gimbal 152 to a predetermined angular displacement about common pivot 128 regardless of the amount of displacement of stick 108. The greater the degree of displacement, the greater the vertical displacement between the soft and default force profiles or the stiff and default force profiles.

The single displacement only occurs for one direction of displacement of stick 108. For instance, if in the stiff mode and the stick 108 is displaced clockwise from the ground neutral position, the gimbal 152 may be moved a fixed displacement in the counterclockwise direction for all angular displacements on the clockwise side of ground neutral. However, if the stick 108 was then subsequently displaced in the counterclockwise direction such that the stick 108 passes on the counter clockwise side of ground neutral, the gimbal may be moved a fixed displacement in the clockwise direction for all angular displacements of the stick on the counterclockwise side of ground neutral.

The control could be user configured with varying degrees of stiff or soft modes by varying the amount of the single displacement.

The use of this system 100 provides the significant benefits of using an indirect drive system (i.e. actuator 156 is not directly coupled to stick 108 and passive feedback is used) such that the system is fail passive, but also provides the ability for the force profile of the feedback provided to the pilot can be tailored to a given pilot.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A control system for an aircraft comprising:
   a passive feedback arrangement movable relative to a mechanical ground;
   a stick moveable relative to the mechanical ground and the passive feedback arrangement, the passive feedback arrangement acting on the stick to resist movement of the stick relative to the passive feedback arrangement;
   a positioning arrangement being coupled to the passive feedback arrangement for adjusting the position of the passive feedback arrangement relative to the mechanical ground in response to movement of the stick relative to the mechanical ground;
   wherein the positioning arrangement includes an actuator coupled to the passive feedback arrangement for actively adjusting the position of the passive feedback arrangement relative to the mechanical ground; and wherein the positioning arrangement includes a controller controlling the actuator to adjust the position of the passive feedback arrangement.

2. The control system of claim 1, wherein the positioning arrangement is configured with user selectable resistance modes including a default mode and at least one custom mode, the positioning arrangement adjusting the position of the passive feedback arrangement, when in the custom mode, relative to the mechanical ground in response to movement of the stick relative to the mechanical ground to adjust a resistance profile applied to the stick by the passive feedback arrangement.

3. The control system of claim 2, wherein the positioning arrangement is configured such that the at least one custom mode includes a soft mode in which the positioning arrangement adjusts the position of the passive feedback arrangement relative to the mechanical ground to decrease the resistance profile to decrease resistance applied to the stick opposing movement of the stick relative to the mechanical ground.

4. The control system of claim 2, wherein in the default mode, the positioning arrangement is configured to hold the passive feedback arrangement in a fixed position relative to the mechanical ground.

5. The control system of claim 2, wherein the passive feedback arrangement includes a gimbal carrying a resistance arrangement, the positioning arrangement is coupled to and selectively adjusts the position of the gimbal and the resistance arrangement relative to the mechanical ground; and wherein the positioning arrangement is configured such that in the default mode, the positioning arrangement maintains the gimbal in a fixed position relative to the mechanical ground.

6. The control system of claim 2, wherein the positioning arrangement is configured such that the at least one custom mode includes a stiff mode in which the positioning arrangement adjusts the position of the passive feedback arrangement relative to the mechanical ground to increase the resistance profile to increase the resistance applied to the stick opposing movement of the stick relative to the mechanical ground.

7. The control system of claim 6, wherein the positioning arrangement is configured such that the at least one custom mode includes a soft mode in which the positioning arrangement adjusts the position of the passive feedback arrangement relative to the mechanical ground to decrease the resistance profile to decrease resistance applied to the stick opposing movement of the stick relative to the mechanical ground.

8. The control system of claim 6, wherein the positioning arrangement is configured such that in the stiff mode, the positioning arrangement drives the passive feedback arrangement relative to the mechanical ground in a direction opposite a direction of movement of the stick relative to the mechanical ground.

9. The control system of claim 1, wherein the passive feedback arrangement includes a gimbal carrying a resistance arrangement, the positioning arrangement is coupled to and selectively adjusts the position of the gimbal and the resistance arrangement relative to the mechanical ground.

10. The control system of claim 9, wherein the stick engages the resistance arrangement and movement of the stick relative to the gimbal changes the position of the resistance arrangement relative to the gimbal, wherein changes in the position of the resistance arrangement relative to the gimbal changes the resistance the passive feedback arrangement applies to the stick to resist movement of the stick.

11. The control system of claim 1, further including a position sensor that senses the position of the stick relative to the mechanical ground, the controller controlling the actuator to adjust the position of the passive feedback arrangement based on the sensed position sensed by the position sensor.

12. The control system of claim 1, wherein the positioning arrangement is indirectly coupled to the stick via the passive feedback arrangement such that the stick can move relative to the mechanical ground independent of movement of the positioning arrangement.

13. The control system of claim 1, wherein the stick is moveable relative to the mechanical ground independent of the positioning system.

14. The control system of claim 1, wherein the positioning arrangement is configured such that the positioning arrangement drives the passive feedback arrangement relative to the mechanical ground in a direction opposite a direction of movement of the stick relative to the mechanical ground.

15. The control system of claim 1, wherein the positioning arrangement is user configurable to adjust a rate at which the positioning arrangement adjusts the position of the passive feedback arrangement relative to the mechanical ground relative to a rate at which the stick is moved relative to the mechanical ground.

16. A control system for an aircraft comprising:
a passive feedback arrangement movable relative to a mechanical ground;
a stick moveable relative to the mechanical ground and the passive feedback arrangement, the passive feedback arrangement acting on the stick to resist movement of the stick relative to the passive feedback arrangement;
a positioning arrangement being coupled to the passive feedback arrangement for adjusting the position of the passive feedback arrangement relative to the mechanical ground in response to movement of the stick relative to the mechanical ground;
wherein the positioning arrangement is configured with user selectable resistance modes including a default mode and at least one custom mode, the positioning arrangement adjusting the position of the passive feedback arrangement, when in the custom mode, relative to the mechanical ground in response to movement of the stick relative to the mechanical ground to adjust a resistance profile applied to the stick by the passive feedback arrangement;
wherein the positioning arrangement is configured such that the at least one custom mode includes a soft mode in which the positioning arrangement adjusts the position of the passive feedback arrangement relative to the mechanical ground to decrease the resistance profile to decrease resistance applied to the stick opposing movement of the stick relative to the mechanical ground;
wherein the positioning arrangement is configured such that the at least one custom mode includes a stiff mode in which the positioning arrangement adjusts the position of the passive feedback arrangement relative to the mechanical ground to increase the resistance profile to increase the resistance applied to the stick opposing movement of the stick relative to the mechanical ground;
wherein the positioning arrangement is configured such that the at least one custom mode includes a soft mode in which the positioning arrangement adjusts the position of the passive feedback arrangement relative to the mechanical ground to decrease the resistance profile to decrease resistance applied to the stick opposing movement of the stick relative to the mechanical ground; and
wherein the positioning arrangement is configured such that in the soft mode, the positioning arrangement drives the passive feedback arrangement relative to the mechanical ground in a same direction as a direction of movement of the stick relative to the mechanical ground.

17. A control system for an aircraft comprising:
a passive feedback arrangement movable relative to a mechanical ground;
a stick moveable relative to the mechanical ground and the passive feedback arrangement, the passive feedback arrangement acting on the stick to resist movement of the stick relative to the passive feedback arrangement;
a positioning arrangement being coupled to the passive feedback arrangement for adjusting the position of the passive feedback arrangement relative to the mechanical ground in response to movement of the stick relative to the mechanical ground;
wherein the positioning arrangement is configured with user selectable resistance modes including a default mode and at least one custom mode, the positioning arrangement adjusting the position of the passive feedback arrangement, when in the custom mode, relative to the mechanical ground in response to movement of the stick relative to the mechanical ground to adjust a resistance profile applied to the stick by the passive feedback arrangement;
wherein the positioning arrangement is configured such that the at least one custom mode includes a stiff mode in which the positioning arrangement adjusts the position of the passive feedback arrangement relative to the mechanical ground to increase the resistance profile to increase the resistance applied to the stick opposing movement of the stick relative to the mechanical ground;
wherein the positioning arrangement is configured such that the at least one custom mode includes a soft mode in which the positioning arrangement adjusts the position of the passive feedback arrangement relative to the mechanical ground to decrease the resistance profile to decrease resistance applied to the stick opposing movement of the stick relative to the mechanical ground;
wherein the positioning arrangement is configured such that in the stiff mode, the positioning arrangement drives the passive feedback arrangement relative to the mechanical ground in a direction opposite a direction of movement of the stick relative to the mechanical ground; and
wherein the positioning arrangement is configured such that in the soft mode, the positioning arrangement drives the passive feedback arrangement relative to the mechanical ground in a same direction as the direction of movement of the stick relative to the mechanical ground.

18. A control system for an aircraft comprising:
a passive feedback arrangement movable relative to a mechanical ground;
a stick moveable relative to the mechanical ground and the passive feedback arrangement, the passive feedback arrangement acting on the stick to resist movement of the stick relative to the passive feedback arrangement;
a positioning arrangement being coupled to the passive feedback arrangement for adjusting the position of the passive feedback arrangement relative to the mechanical ground in response to movement of the stick relative to the mechanical ground; and
wherein the positioning arrangement is configured such that the positioning arrangement drives the passive feedback arrangement relative to the mechanical ground in a direction that is the same as a direction of movement of the stick relative to the mechanical ground.

19. A control system for an aircraft comprising:
a passive feedback arrangement movable relative to a mechanical ground;
a stick moveable relative to the mechanical ground and the passive feedback arrangement, the passive feedback arrangement acting on the stick to resist movement of the stick relative to the passive feedback arrangement;
a positioning arrangement being coupled to the passive feedback arrangement for adjusting the position of the passive feedback arrangement relative to the mechanical ground in response to movement of the stick relative to the mechanical ground; and
wherein the positioning arrangement is configured to be user switched between a first mode in which the positioning arrangement adjusts the position of the passive feedback arrangement relative to the mechanical ground in a same direction as a direction of the movement of the stick relative to the mechanical ground and a second mode in which the positioning arrangement adjusts the position of the passive feedback arrangement relative to the mechanical ground in an opposite direction as the direction of the movement of the stick relative to the mechanical ground.

20. A control system for an aircraft comprising:
a passive feedback arrangement movable relative to a mechanical ground;
a stick moveable relative to the mechanical ground and the passive feedback arrangement, the passive feedback arrangement acting on the stick to resist movement of the stick relative to the passive feedback arrangement;
a positioning arrangement being coupled to the passive feedback arrangement for adjusting the position of the passive feedback arrangement relative to the mechanical ground in response to movement of the stick relative to the mechanical ground;
wherein:
the stick is moveable relative to the mechanical ground in a first direction;
the passive feedback arrangement is movable relative to the mechanical ground in the first direction and in a second direction, opposite the first direction;
the positioning arrangement configured with a default mode, a stiff mode and a soft mode;
when in the default mode, the positioning arrangement is configured to maintain the passive feedback arrangement in a fixed position relative to the mechanical ground when the stick is moved relative to the mechanical ground;
when in the stiff mode, the positioning arrangement is configured to move the passive feedback arrangement in the second direction relative to the mechanical ground in response to movement of the stick in the first direction; and
when in the soft mode, the positioning arrangement is configured to move the passive feedback arrangement in the first direction relative to the mechanical ground in response to movement of the stick in the first direction.

21. A method of resisting movement of a stick of an aircraft control system comprising the steps of:
sensing movement of stick relative to a mechanical ground; and
adjusting a position of a passive feedback arrangement relative to the mechanical ground in response to the sensed movement of the stick relative to the mechanical ground, the passive feedback arrangement providing resistance to the movement of the stick relative to the mechanical ground; and
wherein the step of adjusting the position of the passive feedback arrangement includes adjusting the position of the passive feedback arrangement in a same direction as a direction of the sensed movement of the stick.

* * * * *